June 17, 1930. F. WILMKING 1,764,235
HOLDER FOR CUTTING FRUIT
Filed Aug. 4, 1928
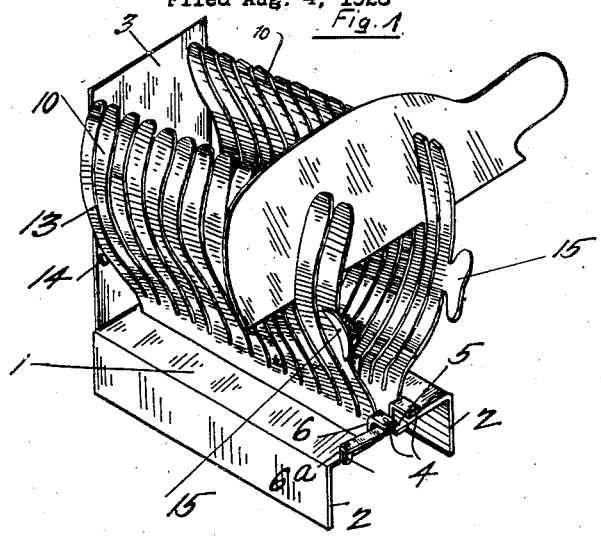
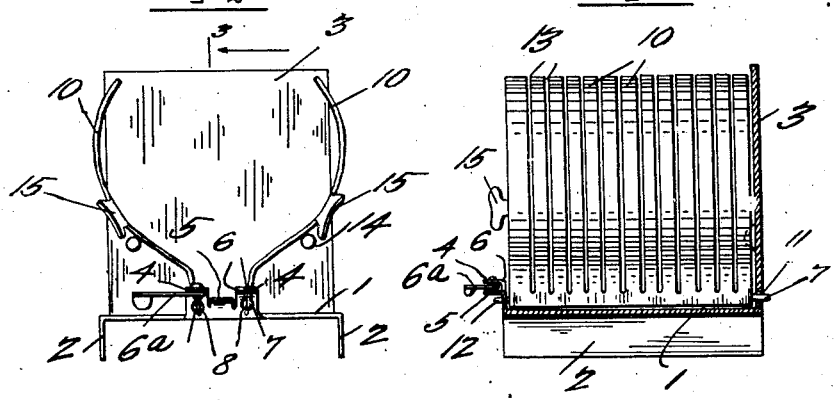
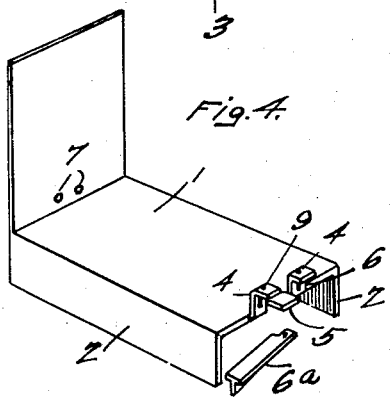
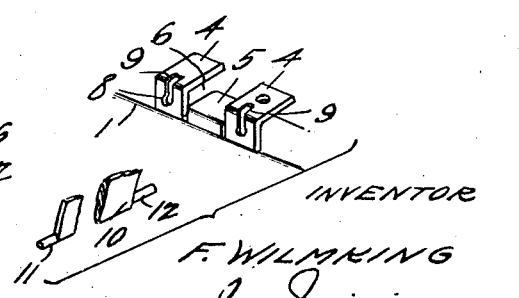
INVENTOR
F. WILMKING Patented June 17, 1930

1,764,235

UNITED STATES PATENT OFFICE

FRIEDRICH WILMKING, OF GUTERSLOH, WESTPHALIA, GERMANY

HOLDER FOR CUTTING FRUIT

Application filed August 4, 1928, Serial No. 297,457, and in Germany April 1, 1928.

This invention relates to improvements in holders for cutting fruit and the like in uniform pieces.

The object of the invention is to provide means for conveniently dismantling the parts of the holder for cleaning purposes.

A further object of the invention is to provide a convenient construction whereby the holder sections may be dismantled, or may be arranged in assembled form and locked in place to a base to form a unit structure.

The invention also comprehends improvements in the details of construction and arrangement of parts which will be hereinafter described and particularly pointed out in the claims.

In the accompanying drawing:—

Fig. 1 is a perspective view of my improved fruit holder.

Fig. 2 is an end elevation, the locking bar being in open position to permit dismantling of the holder sections.

Fig. 3 is a central longitudinal section of the fruit holder.

Figs. 4 and 5 are detail views showing the locking device.

1 indicates a base preferably formed of sheet metal. The sides 2—2 of the base are bent down at right angle to the top of the base, and at one end of the latter is a vertical end wall 3. The opposite end of the top of the base is bent to form two spaced apart outwardly projecting flanges 4—4, and an intermediate outwardly projecting flange 5. The flange 5 is in a lower horizontal level than the flanges 4—4 to form a guideway 6. To one of the flanges 4 is pivoted a latch 6ª adapted to be turned to fit in the guideway 6.

The vertical flange 3 adjacent the base is formed with two bearings 7—7, and the two flanges 4—4 are formed with bearings 8—8 in alignment with the bearings 7—7. The flanges 4—4 are formed with vertical slots 9—9, open at the top and intersecting the bearings 8—8.

10—10 indicate sections of a fruit holder. Each section is provided at its rear end with a pintle 11, and at the front end with a pintle 12, and between the respective ends the section is formed with a series of slots 13 and a finger piece 15.

The pintles 11 are mounted in the bearings 7—7, while the pintles 12 are mounted in the bearings 8, formed in the flanges 4—4, the latch 6 holding the parts in assembled position.

Studs 14 in the vertical plate 3, are positioned to form stops for the sections 10 when locked by the latch 6.

When the fruit holder is in assembled form, as shown in the drawing, the sections are retained in position on the base by the latch 6 and studs 14, and as the slots 13 of the two sections are in alignment, obviously when fruit is placed in the holder, a knife can readily be passed through the slots and the fruit cut in uniform slices.

If it is desired to dismantle the sections for cleaning purposes, the latch 6 is turned from the guideway 5, which frees the pintles 12. Then the pintles can be raised in the slots 9 and free of the flanges 4—4, and by a slight forward movement of the sections, the pintles 11 can be withdrawn from their bearings.

From the foregoing description, it is evident I have provided a simple and convenient sanitary fruit holder, and one which can be readily assembled and dismantled when occasion requires.

What I claim is:

1. A holder for cutting fruit, including a base formed at one end with an upright wall, projections rising from the base at the end remote from the wall, a pair of slotted holder sections removably engaging the upright wall and projections, and latching means cooperating with the projections to prevent separation of the holder sections from the wall or projections, said wall closing the space between the sections at one end of the latter.

2. A holder for cutting fruit including a base having an upright wall at one end formed with bearing openings, projections rising from the base and having upper flanges extending in spaced parallel relation with the base, said projections being vertically slotted, with the openings defined by the slots extending into the flanges, fruit holder sections having pintles at one end to seat in the bearing openings in the wall, pintles at the opposite end to be passed downwardly through the openings in the flanges and seat in the slots in the projections, and a latch pivotally connected to the base to be moved beneath the flanges and above the pintles of the fruit holder sections to prevent upward movement of the latter.

In testimony whereof I affix my signature.

FRIEDRICH WILMKING.